United States Patent [19]

Zittel

[11] Patent Number: 5,429,041

[45] Date of Patent: Jul. 4, 1995

[54] BLANCHER WITH MULTIPLE HEATING ZONES

[75] Inventor: David R. Zittel, Columbus, Wis.

[73] Assignee: Lyco Manufacturing, Inc., Columbus, Wis.

[21] Appl. No.: 275,129

[22] Filed: Jul. 14, 1994

Related U.S. Application Data

[63] Continuation-in-part of Ser. No. 122,782, Sep. 15, 1993, Pat. No. 5,329,842.

[51] Int. Cl.$^6$ .................. A23L 3/00; A23N 12/00; A47J 37/12; F25D 25/02
[52] U.S. Cl. .................. 99/348; 99/355; 99/360; 99/404; 99/409; 99/470; 99/443 C; 99/517; 134/65; 134/132
[58] Field of Search .......... 99/348, 352, 355, 360, 99/365, 403, 404, 409, 450, 470, 483, 487, 516, 517, 534, 536, 477–479, 443 R, 443 C; 366/81, 91, 101, 102, 234, 290, 318, 319, 322, 324; 134/65, 132; 62/381; 100/117, 145

[56] References Cited

U.S. PATENT DOCUMENTS

| | | |
|---|---|---|
| 1,231,002 | 6/1917 | Steere . |
| 1,290,396 | 1/1919 | Steere . |
| 1,806,957 | 5/1931 | Stocking . |
| 2,166,197 | 7/1939 | Schaub . |
| 2,314,871 | 3/1943 | DeBack . |
| 2,585,293 | 2/1952 | Ashton .................. 99/404 |
| 2,732,789 | 1/1956 | Herberg .................. 99/404 |
| 2,909,872 | 10/1959 | Kearney et al. . |
| 3,086,444 | 4/1963 | DeBack .................. 99/348 |
| 3,135,668 | 6/1964 | Wesson . |
| 3,484,360 | 12/1969 | Sandrock . |
| 3,760,714 | 9/1973 | Lortz . |
| 3,924,831 | 12/1975 | Millauer .................. 366/319 |
| 4,033,142 | 7/1977 | Schorsch et al. . |
| 4,092,015 | 5/1978 | Koch .................. 366/81 |
| 4,410,553 | 10/1983 | McGinty . |
| 4,627,735 | 12/1986 | Rose et al. .................. 366/81 |
| 4,688,476 | 8/1987 | Zittel . |
| 4,733,607 | 3/1988 | Star et al. .................. 366/319 |
| 4,875,344 | 10/1989 | Zittel .................. 99/348 |
| 4,906,104 | 3/1990 | Nishise et al. . |
| 4,942,810 | 7/1990 | Zittel et al. . |
| 4,980,724 | 12/1990 | Tanaka .................. 366/319 |
| 5,018,438 | 5/1991 | Grandi . |
| 5,125,328 | 6/1992 | Grandi . |
| 5,133,249 | 7/1992 | Zittel . |
| 5,134,926 | 8/1992 | DeFrancisci . |
| 5,146,841 | 9/1992 | Zittel . |

*Primary Examiner*—Timothy F. Simone
*Attorney, Agent, or Firm*—Lathrop & Clark

[57] ABSTRACT

A water tank is divided into a first heated compartment and a second heated compartment by an insulated baffle. A perforated cylinder is mounted within the tank and has a first segment which extends within the first heated tank compartment and a second segment which extends within the second heated tank compartment. Portions of a helical auger extend within each cylinder segment. Heated water at a first temperature is supplied to the first heated compartment by a first heated water manifold, and heated water at a second, higher temperature is supplied to the second heated compartment by a second heated water manifold. Mixing of the two temperatures of water is prevented by the insulating baffle. Food product is caused to traverse the length of the first heated compartment by the auger, and is transferred over the baffle into the second heated compartment by a lifting flight which elevates food product from the water into a chute which discharges into the second heated compartment. A tank may be divided into three or more compartments for more particular control of product heating. A single self-contained apparatus thus blanches and food product through a range of temperature regions in a continuous process.

13 Claims, 6 Drawing Sheets

BLANCHER WITH MULTIPLE HEATING ZONES

RELATED APPLICATION

This application is a continuation-in-part of U.S. patent application Ser. No. 08/122,782, filed Sep. 15, 1993 now U.S. Pat. No. 5,329,842.

FIELD OF THE INVENTION

This invention relates to apparatus for processing food in general, and to apparatus for heating food products within a water bath in particular.

BACKGROUND OF THE INVENTION

In response to competitive pressures and the demands of continual product improvement philosophies such as Total Quality Management, food product manufacturers in the food processing industry are striving to increase production quality and production rates without significantly increasing costs. Food products which are manufactured in a continuous line often require treatment at various temperatures for prescribed periods of time. To increase a manufacturer's output it is necessary to increase the speed of treatment or to increase the capacity of treatment equipment. Increased treatment speed requires increasingly efficient heat transfer processes, and may affect the taste and texture attributes of the final product. One way to increase capacity is to add additional treating units to an existing line. Installation of new machines, however, may require the relocation of numerous apparatus, and in some cases may require costly expansion of plant facilities. Ideally, increased capacity treatment equipment should take up no greater floor space than the equipment it replaces.

Certain food products, for example dry beans (for manufacturing pork and beans) have conventionally been cooked in two or three blanchers because it is important to gradually increase the temperature of the product to avoid cracking and fracturing. Multiple blanchers require additional floor space and conveying equipment between blanchers.

What is needed is a single compact apparatus for heating foot products in a continuous process which allows incremental increase of temperature treatment ranges.

SUMMARY OF THE INVENTION

The blancher of this invention has a water tank with an inlet end and a discharge end. A baffle divides the tank into a first heated compartment and a second heated compartment. The second compartment contains water at a higher temperature than that in the first heated compartment. A perforated cylinder is mounted to rotate within the tank so that water contained in the tank will enter the cylinder. The cylinder has an inlet opening near the inlet end of the tank for receiving introduced food product and a discharge opening near the discharge end of the tank where food product which has moved through the cylinder can be discharged. The cylinder is divided into a first segment which extends within the first heated compartment of the tank and a second segment which extends within the second heated compartment of the tank. A helical auger is positioned substantially within the perforated cylinder to rotate with the cylinder. Portions of the auger extend axially within the first segment of the cylinder and portions of the auger extend axially within the second segment of the cylinder. A chute extends between the first heated compartment and the second heated compartment of the tank. At least one lifting flight is located within the cylinder in the first heated side of the tank and is rotatable with the cylinder first segment to elevate food product from within the first heated compartment of the tank to deposit the food product in the chute to be discharged into the second heated compartment of the tank. A food product introduced at the tank inlet end will thus traverse the tank and be subjected to heating within two distinct ranges of temperature. The discharge between the first heated tank compartment and the second heated tank compartment may be a single bucket type discharge, in which the chute extends between the cylinder first segment and the cylinder second segment and is fixed to the cylinder to rotate with the cylinder, and wherein the lifting flight extends between the perforated side wall of the cylinder and the discharge chute. This type of discharge is thus co-rotating with the cylinder and presents no pinch points for possible rupture of pouched product. Alternatively, the chute may be fixed with respect to the tank and a plurality of lifting flights extend radially outwardly from the chute which rotate with the cylinder around the chute.

The cylinder first segment may be rotatably mounted independently of the cylinder second segment, such that the cylinder first segment is rotatable at a rate different than that of the cylinder second segment.

It is an object of the present invention to provide a food treatment apparatus which heats the food product in a sequence at different temperature ranges in a continuous process.

It is another object of the present invention to provide a food treatment apparatus which heats food product at different temperature ranges within a compact space.

It is an additional object of the present invention to provide a food treatment apparatus which advances food product from a first zone of heating to a second zone of heating with minimal disturbance or damage.

It is yet another object of the present invention to provide an apparatus for heating food product at multiple temperature ranges in sequential steps.

Further objects, features, and advantages of the invention will be apparent from the following detailed description when taken in conjunction with the accompanying drawings.

DESCRIPTION OF THE PREFERRED EMBODIMENTS

Figure 1:
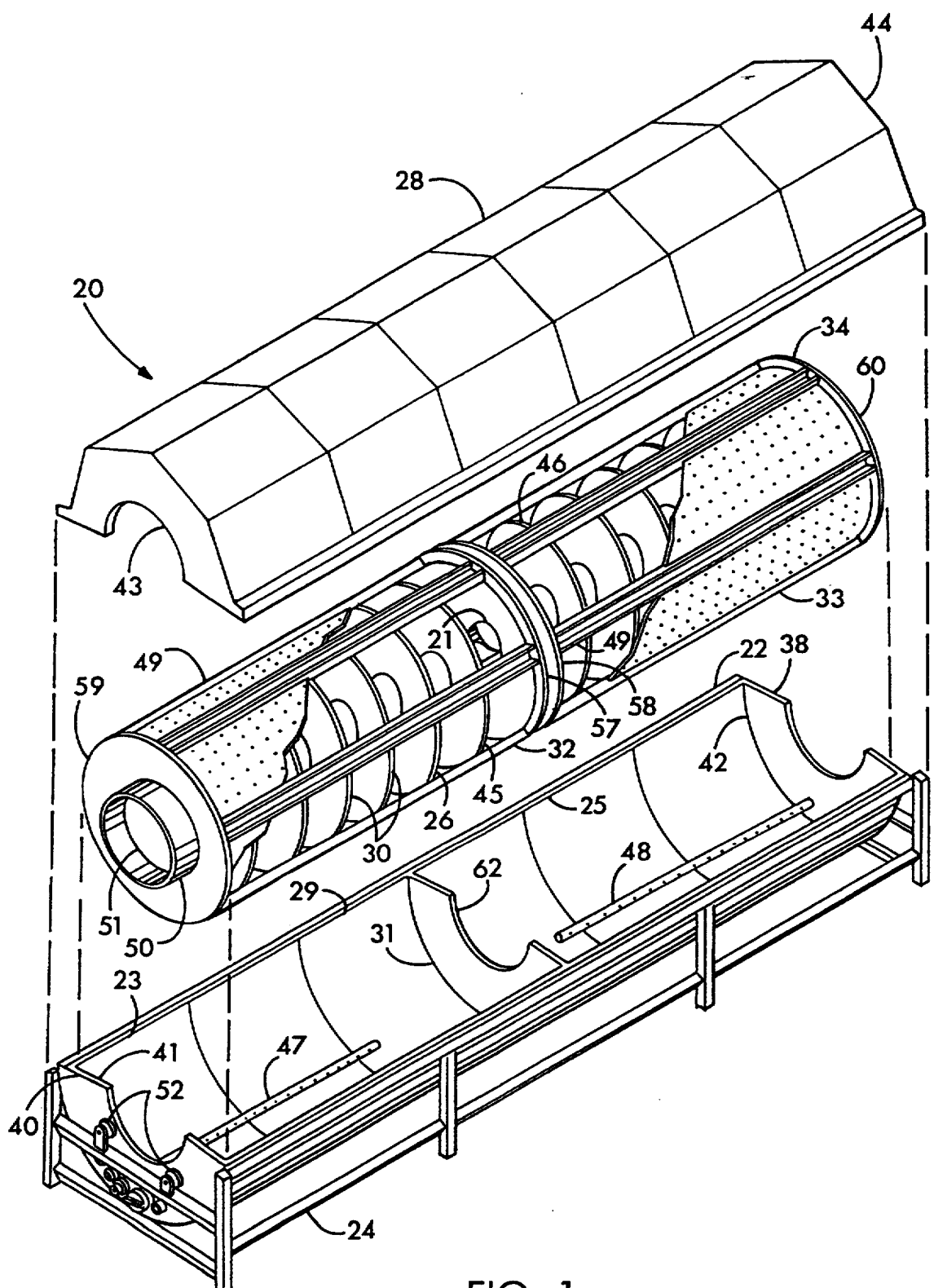
FIG. 1 is an exploded isometric view, partly broken away, of the blancher of this invention.

Referring more particularly to FIGS. 1-12 wherein like numbers refer to similar parts, a multiple heating zone blancher 20 is shown in FIG. 1. The apparatus has a tank 22 which is divided into a first heated compartment 23 and a second heated compartment 25 by an insulated baffle 31. An intermediate discharge assembly 21 transfers treated food product from the first compartment 23 to the second compartment 25.

The apparatus 20 tank 22 has an open top and is supported by a frame 24. A helical auger 26 is longitudinally mounted within the tank 22 and an elongated vaulted cover 28 fits over and covers the tank 22. The tank has a semi-cylindrical wall 29 with drains located at its lowest portion. Cleanouts are located in each end of the tank.

The auger 26 is rotatably mounted within the tank 22 and has stainless steel flights 30. A perforated cylinder 34 encloses the auger 26 and is formed of a plurality of perforated screens. The auger 26 is fixed to the cylinder 34 and rotates with it. The perforated cylinder 34 contains the food product 36 being conveyed by the auger 26. The cylinder 34 and auger 26 are driven by a motor (not shown) at a rate selected to achieve the desired residence of the food product within the apparatus 20. The motor may drive the drum directly by engaging a sprocket coaxial with a drum tube journal 50, or it may drive the rotatable trunnions 52 which are mounted to the frame and which support the cylinder 34 for rotatable motion.

The cylinder 34 is divided into two segments 32, 33. The first cylinder segment 32 rotates within the first heated compartment 23 of the apparatus 20, and the second cylinder segment 33 rotates within the second heated compartment 25 of the tank.

As the auger 26 rotates, its flights 30 move the food product 36 being treated from the inlet end 40 to the discharge end 38 of the tank 22. The end walls 41, 42 of the tank and the end walls 43, 44 of the cover 28 form holes through which the tube journals 50 extend. The tube journals 50 also define the inlet opening 51 and the outlet opening of the cylinder 34. The tube journals 50 and the cylinder 34 and connected auger 26 are supported at both ends of the tank 22 by trunions 52 which are mounted to the frame 24 to support the journals 50 in a conventional manner such that the journals 50 do not make contact with the walls 41, 42, 43, 44 of the tank 22 or cover 28. The vaulted cover 28 may be hingedly attached to the tank 22 so that it may be opened from either side of the apparatus as in the manner disclosed in U.S. Pat. No. 4,788,476 to Zittel, the disclosure of which is hereby incorporated herein by reference, or the cover 28 may be attached to the tank 22 in any conventional manner.

The stainless steel flights 30 of the auger 25 extend helically toward the discharge end 38 of the apparatus 20 such that when the auger 26 is rotated in a clockwise direction, the food product contained within the cylinder 34 is propelled by the auger flights 30 toward the discharge end 38.

The auger 26 is divided into a first portion 45 which is located within the first segment 32 of the cylinder 34 and a second portion 46 which is located within the second segment 33 of the cylinder.

Heated water is supplied to the first heated compartment 23 of the tank from a heated water supply (not shown) by a heated water manifold 47. The first heated water manifold 47 is a tube having a plurality of apertures which is connected to the wall 29 of the tank beneath the rotating cylinder 34. The manifold will typically be under thermostatic control to retain the water within the first heated compartment 23 at a desired preset temperature.

Heated water at a temperature greater than that introduced into the first heated compartment is supplied to the second heated compartment 25 from a heated water supply (not shown) by a second water manifold 48. The second water manifold 48 is similar to the first water manifold and is connected to the wall 29 of the tank beneath the rotating cylinder 34 within the second heated compartment 25 and is also typically under thermostatic control.

As shown in FIG. 1, the cylinder 34 is divided into the first and second segments by two intermediate circular plates 57, 58. The intermediate plates arc joined to the cylinder inlet end plate 59 and the outlet end plate 60 respectively by a plurality of axially extending C-channel structural members 49. The two intermediate plates arc rigidly connected to one another by a connecting tube 61 which passes through a semi-circular cut-away 62 in the baffle 31. The auger 26 is preferably connected to and supported by the structural members 49. Alternatively a central tube, not shown, may extend axially from the inlet end 40 to the discharge end 38, with appropriate openings for introducing product into the intermediate discharge assembly 21.

In certain applications, particularly where it is desired to treat liquid or semiliquid food product, for example soup, or catsup, the food product is packaged within plastic bags or pouches 54. Each pouch is typically formed of a plastic membrane which is sealed with a clip at each end. A pouch may be as small as one inch long, or over a foot in length, depending on the volume to be contained therein. Food product within a pouch 54 is particularly susceptible to being discharged from the pouch through a rupture in the plastic membrane. All sharp edges of the apparatus 20 must be kept from contact with the pouches 54. Furthermore, possible pinch points between fixed and rotating portions of the apparatus 20 must be avoided. Ruptured pouches of food product are undesirable not only because of the destruction and waste of food product, but because the spilled food product will require additional or more frequent downing of the apparatus for cleaning.

Figure 2:
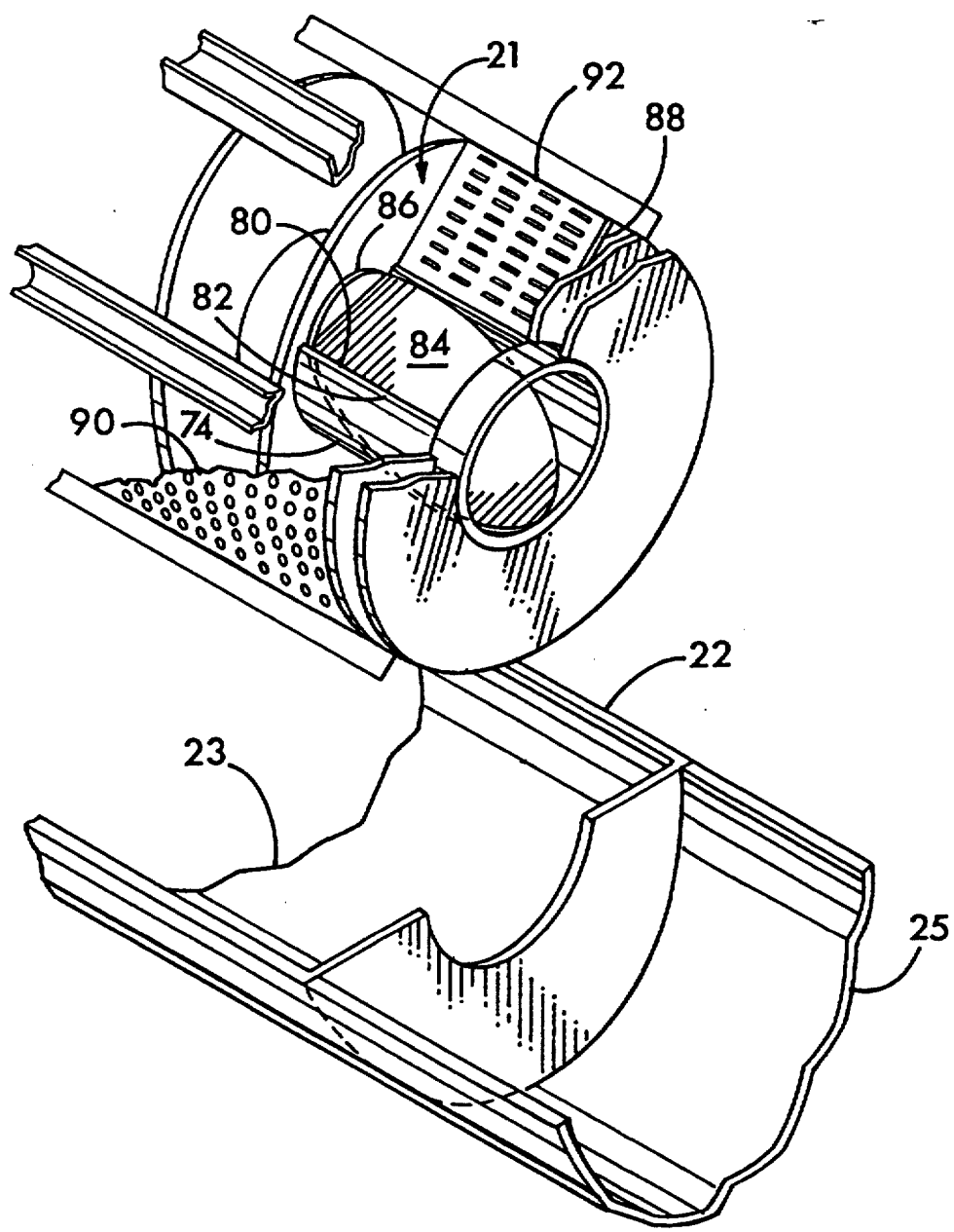
FIG. 2 is a fragmentary isometric view, partly broken away and exploded of the blancher of FIG. 1.

The intermediate discharge 21, best shown in FIG. 2, avoids possible pinch points by eliminating contact between fixed and rotating parts of the apparatus. The discharge 21 provides a means for conveying food product which has been heated to a first temperature into the second portion 46 of the cylinder 34 for elevation to a higher temperature. The discharge 21 has a chute 74 which is preferably semi-cylindrical and which is fixed to the first segment 32 of the cylinder 34 to rotate with the cylinder. The chute 74 extends from the first portion 45 of the auger 26 toward the second portion 46 of the auger. The chute 74 is preferably fixed by welding to both the auger 26 first portions 45.

The chute 74 has a discharge opening 78 which communicates with the second segment of the cylinder 34 within the second compartment of the tank. The chute 74 has an inlet opening 80 which is within the cylinder 34 first segment 32 and which is defined by axially extending lips 82 of the chute which are located at approximately the same radial distance from the axis of the cylinder 34.

The chute 74 preferably has an inclined surface 84 which is spaced opposite the chute inlet opening 80 and which is inclined radially outwardly towards the second tank compartment 25 to facilitate discharge of material deposited within the chute 74. The inclined surface extends from the rear wall 86 of the chute to the chute discharge opening 78. In a semi-cylindrical chute 74, the inclined surface may be formed by a generally elliptical plate with a straight rear edge welded within the chute.

The discharge 21 has a single lifting flight 88 which extends between the side wall 90 of the first segment 32 of the cylinder 34 and the chute 74. The lifting flight 88 has a perforated base plate 92 which is welded to one lip 82 of the chute along the chute inlet opening 80.

The operation of the blancher 20 is shown in FIGS. 3-8. For illustrative purposes the food product has been shown contained within pouches 54. It should be understood that unpackaged food product may also be processed within the apparatus 20. Food product pouches 54 are infed into the cylinder 34 at the inlet opening 51 and continuously advanced through the water 94 within the tank 22 by the auger 26. The food product is moved through the first segment 32 of the cylinder 34 until it reaches the intermediate end plate 57 where it is in position to be engaged by the lifting flight 88 of the discharge 21.

Figure 3:
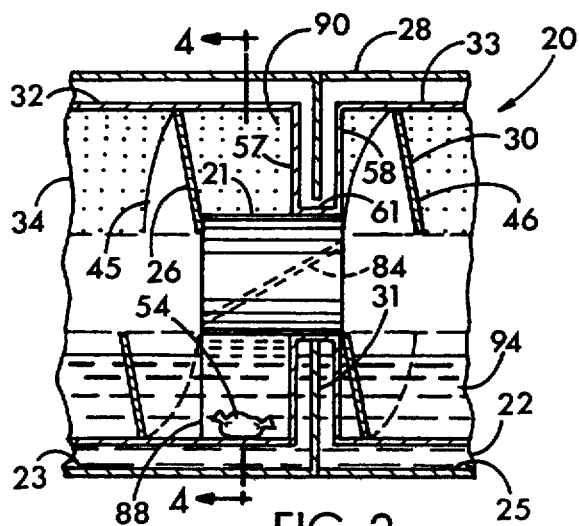
FIG. 3 is a cross-sectional view of the apparatus of FIG. 1 with the discharge engaged with a pouched food product within the first blancher tank section prior to elevating it.
Figure 4:
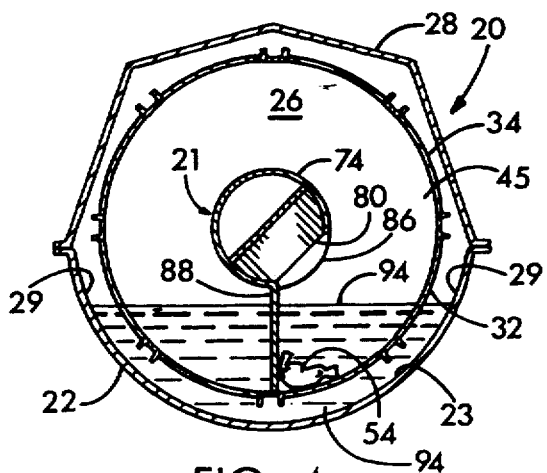
FIG. 4 is a cross-sectional view of the apparatus of FIG. 3 taken along section line 4—4.

As shown in FIGS. 3 and 4, once the lifting flight 88 has rotated such that the lifting flight base plate 92 is in a generally vertical orientation and beneath the chute 74, the lifting flight 88 will engage the pouch 54 and begin to raise it from the water 94. It is important to note that the lifting flight 88 in coming into engagement with the pouch 54 does not rotate with respect to the cylinder 34 or the cylinder side wall 90. Because the lifting flight 88 is fixed to the chute 74 which is itself fixed to the cylinder 34 the discharge 21 rotates with the cylinder. It is the force of gravity which retains the pouch within the water, a force which is too great to be overcome by any frictional engagement between the pouch and the cylinder side wall. The lifting flight 88 provides an elevating platform which engages and elevates the pouch 54.

Figure 5:
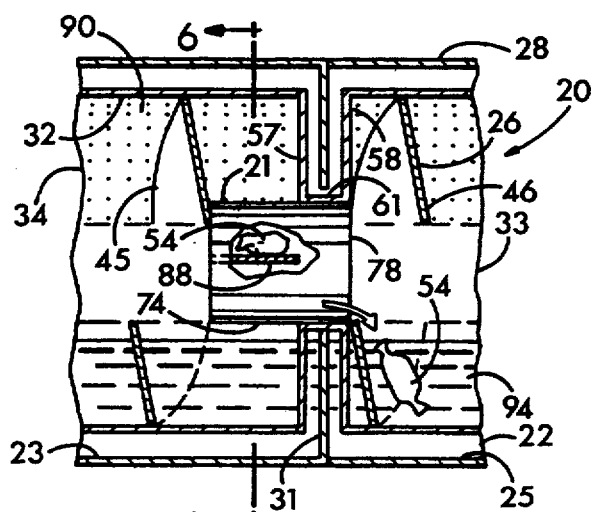
FIG. 5 is a cross-sectional view of the apparatus of FIG. 3 shown with the pouched food product supported on the discharge.
Figure 6:
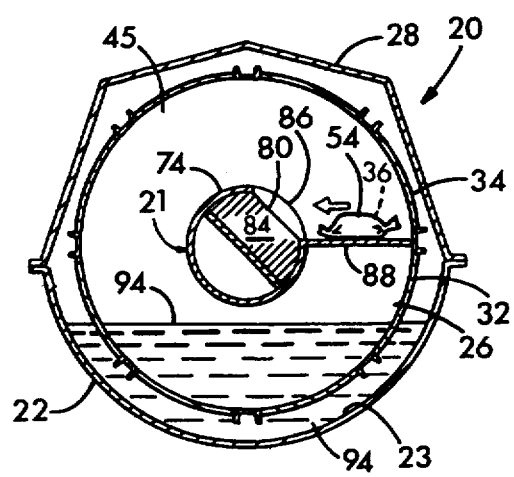
FIG. 6 is a cross-sectional view of the apparatus of FIG. 5 taken along section line 6—6.

As shown in FIGS. 5 and 6, the lifting flight 88 elevates the pouch 54 out of the water 94. The perforated base plate 92 of the flight 88 allows heated water to drain back into the first heated compartment 23 of the tank 22 while retaining the pouch 54 in supportive relation. Should the pouch 54 be disposed against the cylinder side wall 90 while it is being elevated there is no danger of catching or rupturing the pouch as the flight 88 is welded to the side wall 90 in a fixed relation, providing no possibility of a pinch point.

Figure 7:
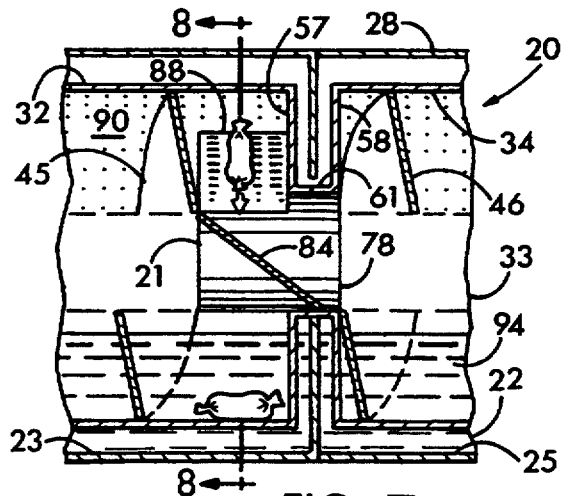
FIG. 7 is a cross-section view of the apparatus of FIG. 3 shown with the pouched food product sliding down the lifting flight to the discharge.
Figure 8:
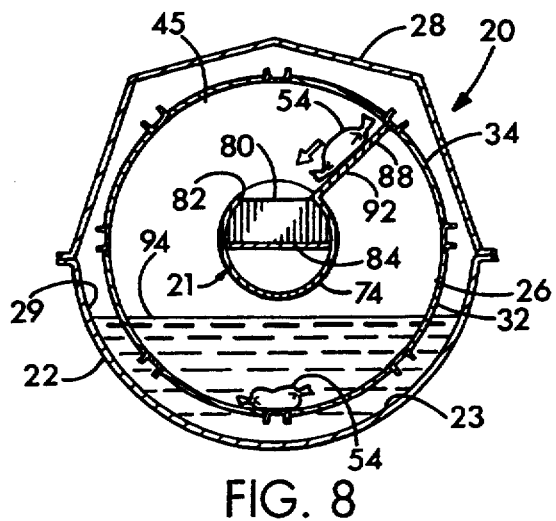
FIG. 8 is a cross-sectional view of the apparatus of FIG. 7 taken along section line 8—8.

As the lifting flight 88 continues to elevate the pouch 54, as shown in FIGS. 7 and 8, the flight base plate 92 takes on a downward inclination. The pouch 54 rests on the base plate 92 until gravity causes the pouch to slide down the base plate 92, across the lip 82 and into the inlet opening 80 of the chute 74.

A pouch 54 which is received within the chute 74 will fall onto the inclined surface 84 of the chute and will thus be discharged into the second cylinder segment 33 within the second heated compartment 25 of the tank 22.

Thus food product will be advanced from the inlet of the apparatus to the outlet in a continuous flow. At the discharge end 40 of the apparatus, a discharge, not shown, similar to the discharge 21 may be provided to elevate the food product from the tank and to a final discharge from the apparatus 20.

The blancher 20 thus allows food to be heated at two distinct ranges of temperatures to achieve desired processed product results.

Figure 9:
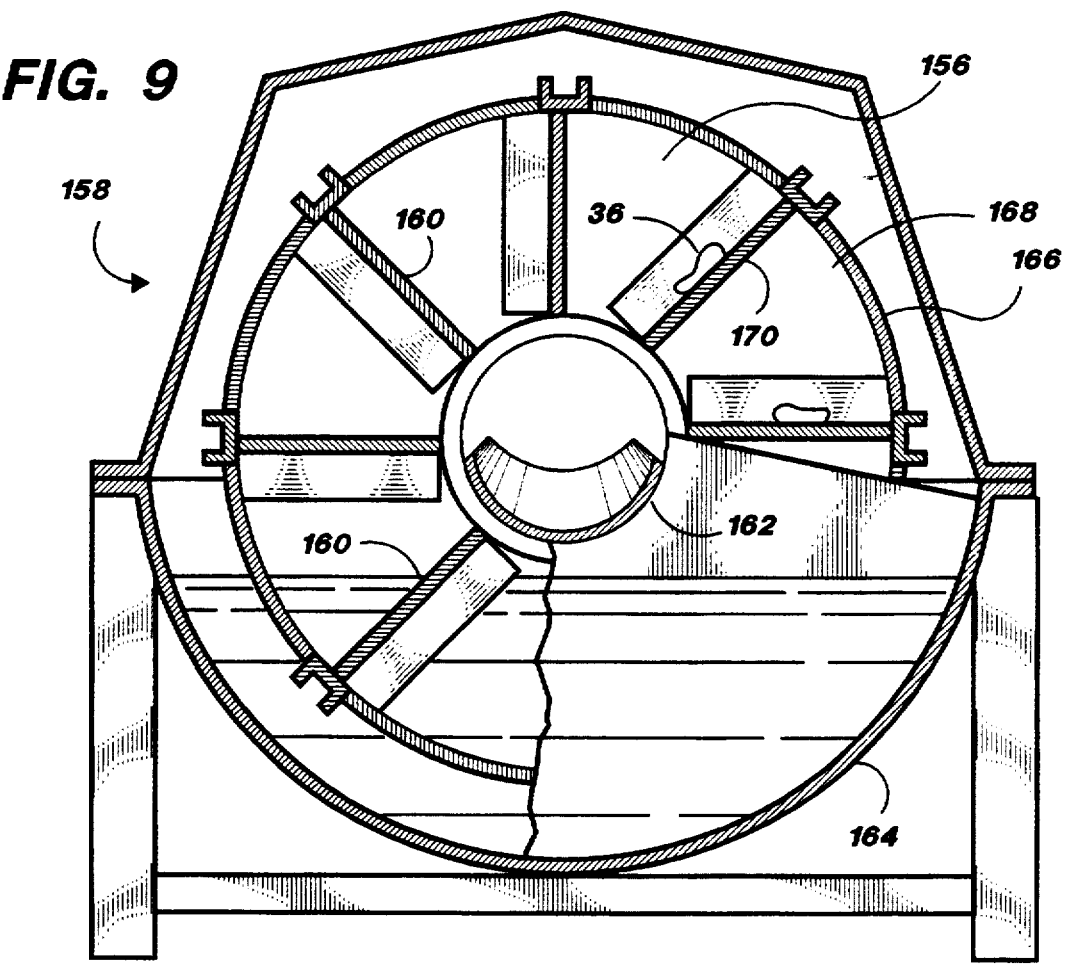
FIG. 9 is a cross-sectional view of an alternative embodiment blancher of the present invention which employs a discharge between the first and second portions of the apparatus which has a plurality of lifting flights.

As shown in FIG. 9, an alternative embodiment apparatus 158 is substantially similar to the apparatus 20 described above, with the exception that it is provided with a discharge assembly 156 between the first heated tank compartment and the second heated tank compartment which has eight lifting buckets or flights 160 which are fixed to the perforated cylinder 166 and a semi-cylindrical discharge chute 162 which is fixed with respect to the tank 164 and remains in place as the perforated cylinder 166 and connected auger 168 rotate.

Each lifting flight 160 of the alternative embodiment discharge 156 has a perforated base plate 170 which rotates with the cylinder 166 and engages against a food product 36 within the water in the tank, lifts the pouch from the water, and drops the pouch into the fixed chute 162.

Figure 10:
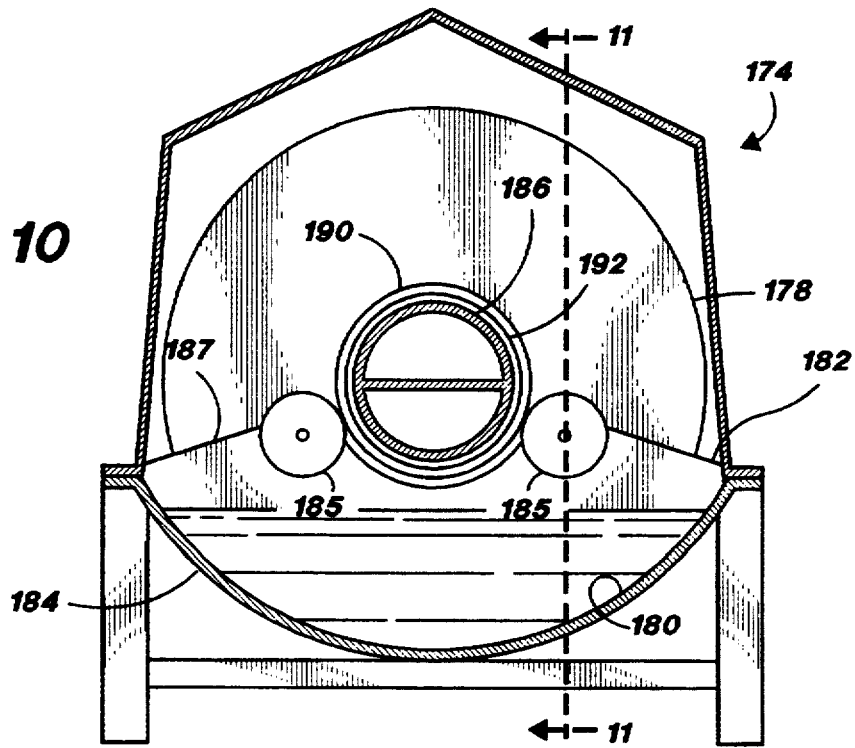
FIG. 10 is a cross-sectional view of an alternative embodiment blancher which has separately supported rotating drums.
Figure 11:
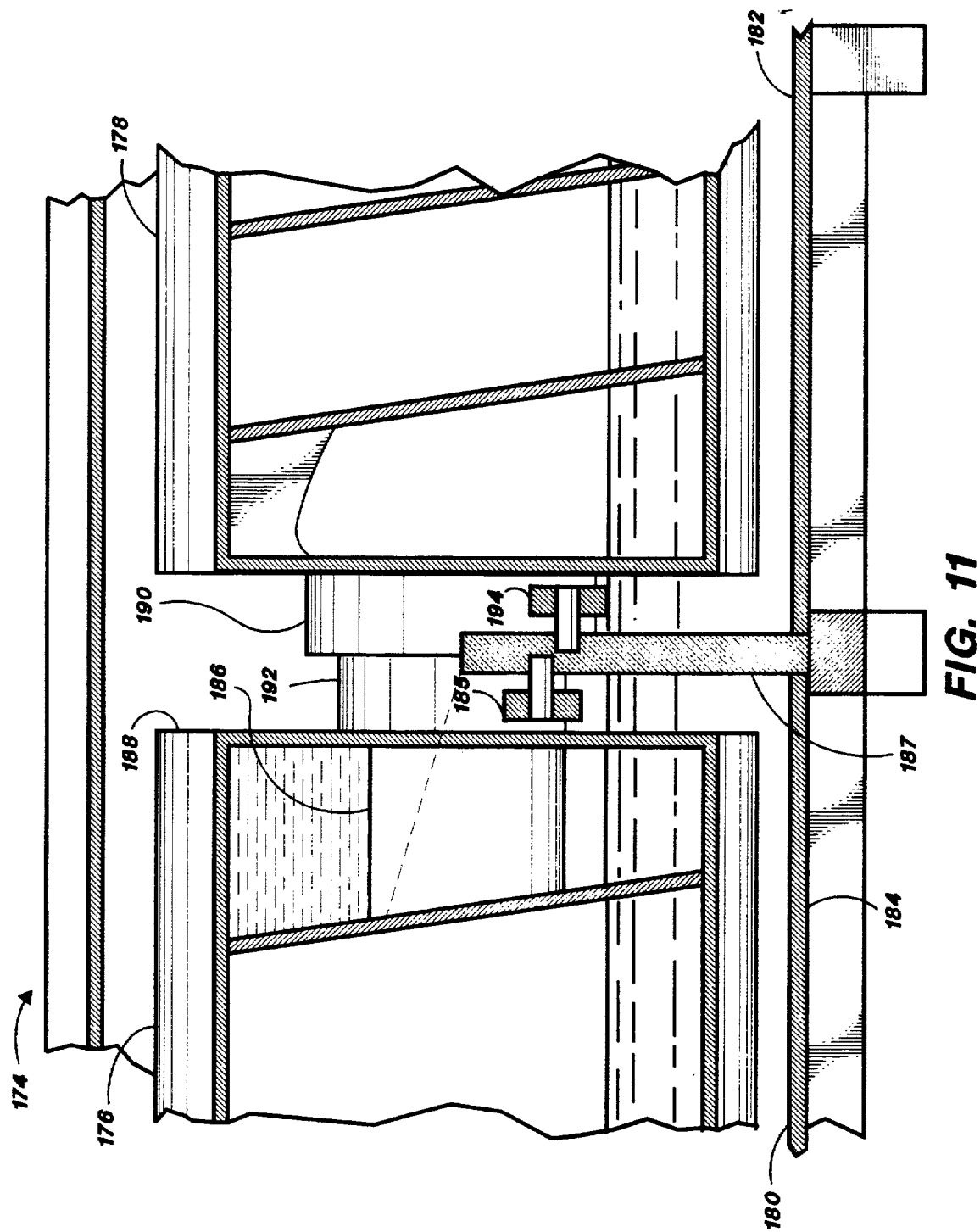
FIG. 11 is a fragmentary cross-sectional view of the apparatus of FIG. 10 taken along section line 11—11.

In certain applications it is desirable to heat the food product within the different temperature ranges for unequal periods of time. This may be achieved by making the first and second chambers unequal lengths, or it may be achieved by rotating the drum at different speeds within the different chambers. An alternative embodiment 174 of the blancher of the present invention is shown in FIGS. 10 and 11 which has two drums 176, 178 which are independently mounted for rotation within the first heated compartment 180 and the second compartment 182, respectively, of a water tank 184.

The first blancher drum 176 is mounted on trunnions located at the inlet of the tank and a second set of rotatable trunnions 185 mounted to the insulating baffle 187 which separates the first heated compartment 180 from the second heated compartment 182. The first blancher drum 176 has a discharge 186, preferably of the single scoop type described above, which protrudes from the outlet end plate 188 and crosses the baffle 184 to extend into the inlet journal 190 of the second blancher drum 178. The discharge 186 also serves as the cylindrical journal 192 of the first blancher drum 176.

The second blancher drum is supported by its journal 190 on two rotatable trunnions 194 also mounted to the insulating baffle 184. The two drums 176, 178 may be rotated at separate rates by drive motors (not shown) which engage sprockets which are connected to portions of the cylindrical drums which extend outside the tank. As the first blancher journal 192 is smaller in diameter than the second blancher drum journal 190, the first blancher drum trunnions 185 are mounted about axes which are slightly above the axes of the second blancher drum trunnions 194.

It should be noted that the apparatus 174 may utilize a multiple lifting flight discharge such as that shown in FIG. 9.

Figure 12:
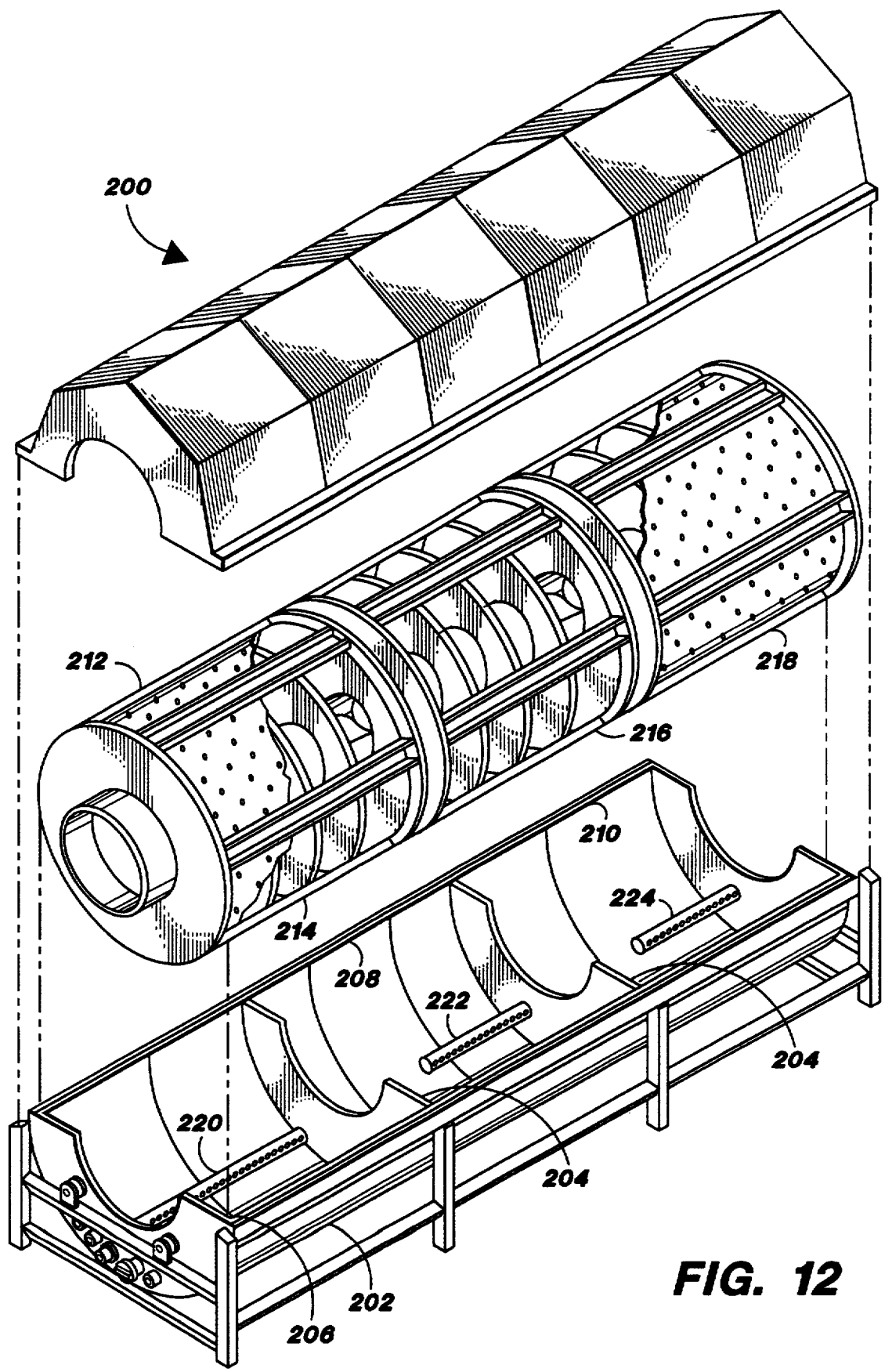
FIG. 12 is an exploded isometric view of an alternative embodiment blancher of this invention having three blanching compartments with water therein retained at different temperatures.

Another alternative embodiment blancher 200 having three heating zones is shown in FIG. 12. The blancher 200 illustrates that the blancher tank may be divided into a plurality of compartments to provide heating at a number of levels to best suit the processing needs of a particular food product. The blancher 200 has a water tank 202 with two insulated baffles 204 affixed therein which divide the tank into a first heated compartment 206, a second heated compartment 208, and a third heated compartment 210. A perforated cylinder 212 extends within the tank 204, and has three segments 214, 216, 218, one corresponding to each heated compartment. Independent water manifolds 220, 222, 224 are positioned within each tank compartment 214, 216, 218 respectively, and discharge water into the tank compartments at progressively higher temperatures.

It is understood that the invention is not confined to the particular construction and arrangement of parts herein illustrated and described, but embraces all such modified forms thereof as come within the scope of the following claims.

I claim:

1. A food processing apparatus, comprising:
   a) a tank having an inlet end and a discharge end;
   b) a baffle which divides the tank into a first heated compartment and a second heated compartment, wherein the temperature in the second heated compartment is different than the temperature in the first heated compartment;
   c) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom, wherein the cylinder is divided into a first segment which extends within the first heated compartment of the tank and a second segment which extends within the second heated compartment of the tank;
   d) an auger positioned substantially within the perforated cylinder to rotate with the cylinder, the auger having portions which define a helical surface, wherein portions of the auger extend axially within the first segment of the cylinder and portions of the auger extend axially within the second segment of the cylinder;
   e) a chute which extends between the first heated compartment and the second heated compartment of the tank; and
   f) at least one lifting flight located within the cylinder first segment and rotatable with the first segment to elevate food product from within the first heated compartment of the tank to deposit the food product in the chute to be discharged into the second heated compartment of the tank, wherein a food product introduced at the tank inlet end will traverse the tank and be subjected to both heating and cooling.

2. The apparatus of claim 1 wherein the chute extends between the cylinder first segment and the cylinder second segment and is fixed to the cylinder to rotate with the cylinder, and wherein the lifting flight extends between the perforated side wall and the discharge chute and is fixed to the discharge chute.

3. The apparatus of claim 1 wherein the chute is fixed with respect to the tank, and wherein a plurality of lifting flights extend radially outwardly from the chute.

4. The apparatus of claim 1 wherein the cylinder first segment is rotatably mounted independently of the cylinder second segment, such that the cylinder first segment is rotatable at a rate different than that of the cylinder second segment.

5. The apparatus of claim 1 wherein the tank is divided into at least three compartments by a plurality of baffles, and wherein the perforated cylinder has segments which correspond to each compartment, and wherein water is maintained within each compartment at different temperatures for controlled heating of food product within the tank.

6. A food processing apparatus, comprising:
   a) a tank having an inlet end and a discharge end;
   b) a baffle which divides the tank into a first heated compartment and a second heated compartment, wherein the temperature within the first compartment is less than the temperature within the second compartment;
   c) a first drum rotatably mounted within the tank first heated compartment, and having a helical auger therein, wherein the auger advances food product from the tank inlet toward the baffle;
   d) a second drum rotatably mounted within the tank second heated compartment and having a helical auger therein, wherein the auger advances food product within the second drum to the tank outlet,
   e) a chute which extends between the first drum and the second drum; and
   f) at least one lifting flight located within the first drum and rotatable with the first drum to elevate food product from within the first heated compartment of the tank to deposit the food product in the chute to be discharged into the second heated compartment of the tank, wherein a food product introduced at the tank inlet end will traverse the tank and be subjected to heating at two different levels.

7. The apparatus of claim 6 further comprising:
   a) a plurality of trunnions mounted rotatably to the baffle to support the first drum; and
   b) a plurality of trunnions mounted rotatably to the baffle to support the second drum.

8. The apparatus of claim 6 further comprising a cylindrical tube which extends from the first drum across the baffle and communicates with the second drum.

9. The apparatus of claim 6 wherein the chute extends between the first drum and the second drum and is fixed to the first drum to rotate with the first drum, and wherein the lifting flight is fixed to the chute.

10. The apparatus of claim 6 wherein the chute is fixed with respect to the tank, and wherein a plurality of lifting flights extend radially outwardly from the chute.

11. The apparatus of claim 6 wherein the tank is divided into at least three compartments by a plurality of baffles, and wherein the perforated cylinder has segments which correspond to each compartment, and wherein water is maintained within each compartment at different temperatures for controlled heating of food product within the tank.

12. A food processing apparatus, comprising:

a) a tank having an inlet end and a discharge end;

b) a baffle which divides the tank into a first heated compartment and a second heated compartment, wherein the baffle prevents mixing of water at a first temperature in the first heated compartment with water at a second, different, temperature in the second heated compartment;

c) a first heated water manifold disposed within the tank first heated compartment;

d) a second heated water manifold disposed within the tank second heated compartment;

e) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom, wherein the cylinder is divided into a first segment which extends within the first heated compartment of the tank and a second segment which extends within the second heated compartment of the tank;

f) an auger positioned substantially within the perforated cylinder to rotate with the cylinder, the auger having portions which define a helical surface, wherein portions of the auger extend axially within the first segment of the cylinder and portions of the auger extend axially within the second segment of the cylinder; and g) means for conveying food product from the first cylinder segment to the second cylinder segment, wherein a food product introduced at the tank inlet end will traverse the tank and be subjected to heating at a plurality of levels.

13. The apparatus of claim 6 wherein the tank is divided into at least three compartments by a plurality of baffles, and wherein the perforated cylinder has segments which correspond to each compartment, and wherein water is maintained within each compartment at different temperatures for controlled heating of food product within the tank.

* * * * *